March 14, 1933.  T. J. KAUFFMAN  1,901,171
STEERING WHEEL ATTACHMENT
Filed July 18, 1932
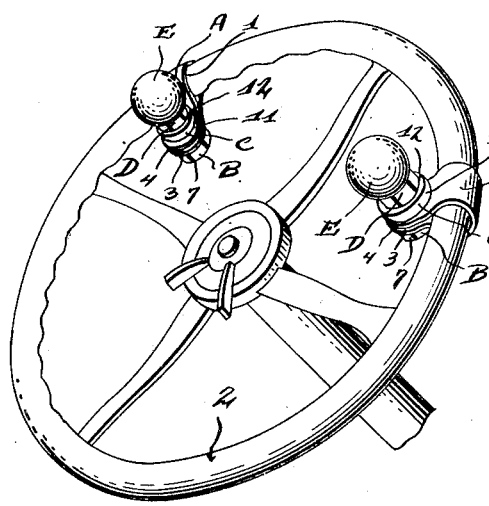
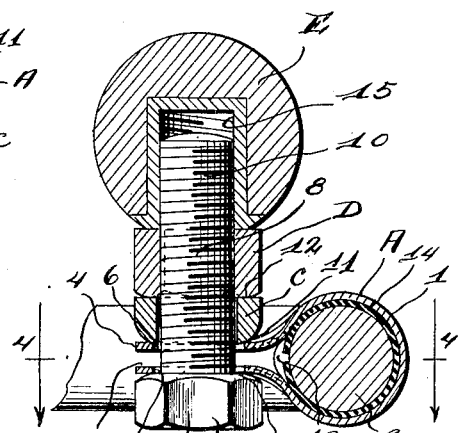
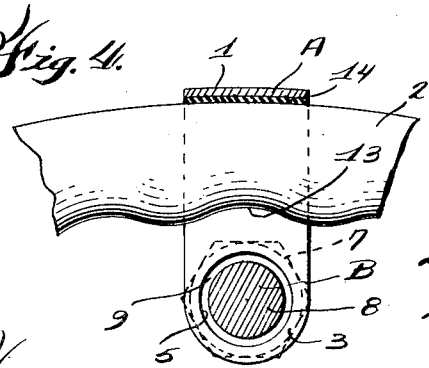
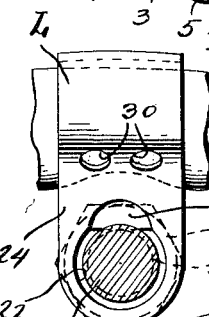
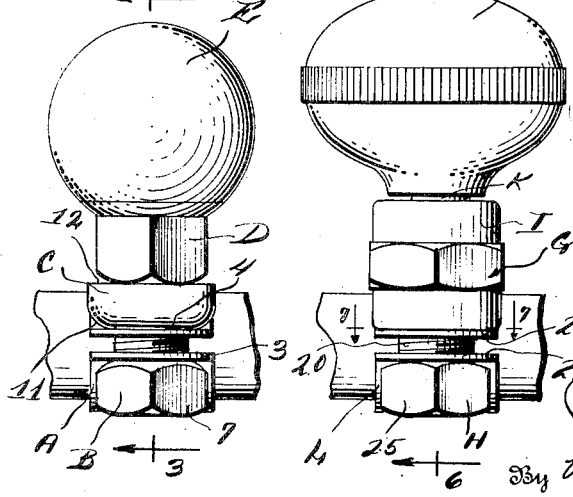
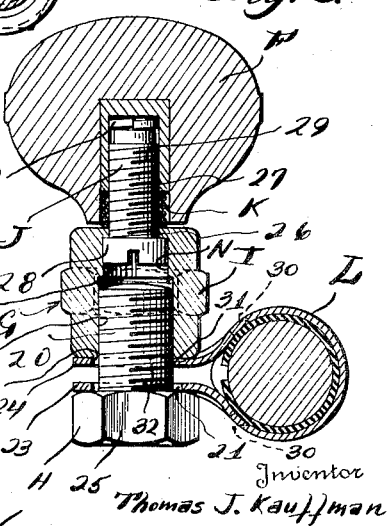
Inventor
Thomas J. Kauffman Patented Mar. 14, 1933

1,901,171

UNITED STATES PATENT OFFICE

THOMAS J. KAUFFMAN, OF GROSSE POINTE VILLAGE, MICHIGAN, ASSIGNOR TO SQUARE D COMPANY, OF DETROIT, MICHIGAN, A CORPORATION OF MICHIGAN

STEERING WHEEL ATTACHMENT

Application filed July 18, 1932. Serial No. 623,244.

This invention relates generally to vehicle steering wheels and refers more particularly to attachments therefor.

One of the essential objects of the invention is to provide a knob attachment which enables steering forces to be applied to a steering wheel in such a way that the wheel may be turned or rotated in relatively wide arcs without the necessity of releasing the grip and taking another grasp.

Another object is to provide a knob that can be easily and quickly attached to a steering wheeel and that may be readily adjusted thereon as desired to suit the convenience of the driver.

A further object is to provide a strong and durable attachment that is simple in construction and can be manufactured and applied for a relatively low amount.

Other objects, advantages and novel details of construction of this invention will be made more apparent as this description proceeds, especially when considered in connection with the accompanying drawing, wherein:

Figure 1 is a perspective view of a vehicle wheel with my invention applied thereto;

Figure 2 is an elevation of one of the knob assemblies illustrated in Figure 1;

Figure 3 is a section on the line 3—3 of Figure 2;

Figure 4 is a sectional view taken on the line 4—4 of Figure 3;

Figure 5 is a view similar to Figure 2 but showing a slight modification;

Figure 6 is a sectional view taken on the line 6—6 of Figure 5.

Figure 7 is a sectional view taken on the line 7—7 of Figure 5.

Referring now to the drawing, A is the steering wheel clamping member; B is the knob support; C is a washer; D is a nut; and E is the knob of an attachment embodying my invention. As shown, the clamping member comprises a single strip of metal and is in the form of a clevis. The body portion 1 of the member is substantially U-shape in configuration for gripping the rim 2 of a steering wheel, while the extensions or arms 3 and 4 respectively thereof are substantially parallel and have aligned openings 5 and 6 respectively therein. The knob support B is in the form of a bolt having a head 7 and a stem 8. The head 7 is polygonal in configuration and has a rounded inner face 9 engaging the extension 3, while the stem 8 is received in the aligned openings 5 and 6 and is provided throughout substantially its entire length with external threads 10. The washer C is sleeved upon the stem 8 and has a rounded face 11 engaging the extension 4. The nut D is conventional in form and engages the external threads 10 of the stem and the flat outer face 12 of the washer C. Preferably the construction of the extensions 3 and 4, washer C and head 7 is such that when the clamping member A is applied to a steering wheel rim such as 2 having finger notches or recesses 13, the extensions 3 and/or 4 will be forced into snug engagement with one of the notches 13 when the nut D is tightened. Thus an extremely firm connection is provided. If desired a strip or layer 14 of resilient material such as rubber composition or rubber fabric may be interposed between the U-shaped portion 1 of the clamping member and the rim 2 of the steering wheel to obviate marring of the rim and slippage of the clamping member. The knob E is mounted on the stem 8 against the nut D. Preferably the knob E simulates a ball in appearance and has an interiorly threaded socket 15 that receives the exteriorly threaded portion 10 of the stem above the nut.

In Figures 5 and 6 I have illustrated a slight modification in which the knob F is swiveled upon the support G. As shown, the support G comprises a bolt H, a nut or union I, screw J and coil spring K. Preferably the stem 20 of the bolt H is exteriorly threaded and extends through aligned openings 21 and 22 respectively in the extensions 23 and 24 respectively of the steering wheel rim clamping member L. The nut I has an interiorly threaded portion M receiving the threaded portion 20 of the stem above the extensions 23 and 24 and cooperates with the head 25 of the bolt to maintain the clamping member upon the steering wheel. Preferably this nut I is provided above the upper end of the stem 20 with a reduced cylindrical portion N so that a shoulder O is provided as a stop or abutment for the upper end of the stem 20, and is provided at the upper end of said portion N with an inwardly extending flange 26 that encircles the exteriorly threaded stem 27 of a screw. The head 28 of this screw is within the cylindrical portion N of the nut and is yieldingly held in engagement with the lower face of the flange 26 by the coil spring K. As shown, this spring is sleeved upon the stem 27 of the screw within an interiorly threaded socket 29 of the knob F. Any suitable means such as the lock washer R may be employed for securing the knob F to the mounting screw J for preventing relative turning between the knob and screw. For the purpose of rendering easier the mounting of the clamping member L upon the steering wheel rim, several holes 30 are provided in opposite sides of the clamping member adjacent the openings 21 and 22 as the consequent reduction of cross section by means of the holes permits easier bending of the clamping member into the position in which it is engaged by the stem 20 of the bolt. In the opening 22 I have also added a projecting ear 31 for engagement with the threads 32 of the bolt stem 20 permitting the extension 24 to be drawn toward the extension 23 by the threads 32 so that the union G can be readily applied to the extended end of the stem 20. Thus with this construction the extensions 24 and 23 of the clamping member can be brought close enough together by the pressure of the fingers so that the upper end of the stem 20 may be received within the opening 22. The bolt threads 32 will then readily engage the ear 31 which acts as a rudimentary thread and causes the extension 24 to be drawn toward the extension 23. Upon tightening the union G upon the stem 20 the ear 31 will be distorted so that it will serve as a locking element for the extension 24 upon the stem 20.

Preferably two knobs such as E or F are used in connection with each steering wheel and are adjusted upon the rim of such wheel so as to be conveniently grasped by the hands of the driver. Thus such an arrangement permits a strong grip upon the wheel by means of either knob. For example, when the right hand of the driver is employed in the necessary operation of gear shifting the left hand may grip one of the knobs. Likewise when the left hand is used for signalling then the right hand may grip one of the knobs. In either instance the grip may be maintained even though the steering wheel is turned in a relatively wide arc. Thus it is unnecessary to take another grip upon the wheel and the possibility of losing control of the wheel while making a turn is therefore entirely obviated. When backing, for instance, out of a garage, one knob may be grasped with one hand while the other hand may be used for any other purpose desired. When the vehicle is on the straightway one or both knobs may be held by the driver as desired. Thus a firm grip upon the wheel may be maintained regardless of the direction in which the vehicle is operated. Such knobs provide ease in steering upon the straightaway, a firm grip upon the wheel in case of tire blowouts or other emergencies, and greater facility in turning. Moreover, the knobs may be readily applied to or adjusted upon steering wheel rims of different dimensions and shapes through adapting the clamping members A or L as the case may be to the contour of the wheel rim by means of the bolts and nuts. Thus the application and use of the knobs are practically universal.

What I claim as my invention is:

1. A steering wheel attachment including a pair of aligned members, a union between and providing a swivel mounting for one of said members, a knob fixed to the swivelly mounted member, yieldable means associated with one of said members and union for cushioning the knob, and a steering wheel rim clamping member projecting from and actuable by portions of said union and the other of said members.

2. A steering wheel attachment including a member attachable to a rim of a steering wheel, a bolt carried by said member, a second bolt in alignment with the first, a knob to be grasped on the second bolt, a union between said bolts providing a swivel mounting for the knob, and a yieldable means between the knob and union maintaining the second bolt in a predetermined position relative to the union and affording a cushion for the knob.

3. A steering wheel attachment including a member attachable to a rim of a steering wheel, a bolt carried by said member, a second bolt in alignment with the first, a knob to be grasped on the second bolt, a union between said bolts providing a swivel mounting for the knob, and means for yieldingly maintaining the second bolt in a predetermined position relative to the union and for cushioning the knob including a spring associated with the second bolt and union.

In testimony whereof I affix my signature.

THOMAS J. KAUFFMAN.